United States Patent Office 3,166,521
Patented Jan. 19, 1965

3,166,521
POLYMERS OF AMINOPYRIMIDINES AND
PROCESS THEREFOR
Edward George Howard, Jr., Hockessin, Del., assignor to
E. I. du Pont de Nemours and Company, Wilmington,
Del., a corporation of Delaware
No Drawing. Filed Mar. 6, 1962, Ser. No. 177,763
5 Claims. (Cl. 260—2)

This invention relates to a new class of polymers containing free amino groups, and to a method for preparing them.

Polymers containing free amino ($NH_2$) groups have desirable properties. For example, they can be dissolved in acids and reprecipitated by neutralization, which property is useful in purification of the polymers and in the making of shaped objects therefrom. Also, they can be modified through reactions of the amino groups to give polymers with greatly altered properties.

It has been found that polymers containing aminopyrimidine nuclei as repeating units can be made by condensation of a dinitrile, $NCCH_2RCH_2CN$, alone or together with a mononitrile, $QCH_2CN$, where R is a divalent, aliphatically saturated hydrocarbyl radical (i.e., a radical obtained by removal of hydrogen from a hydrocarbon) separating the carbons to which it is joined by a chain of at least four carobn atoms, and where Q is hydrogen or aliphatically saturated hydrocarbyl, in the presence of an alkali-metal hydride, an alkyl, α-cyanoalkyl, or cycloalkyl derivative of an alkali metal, or an alkoxide or cycloalkoxide of an alkali metal. The process can be carried out simply by bringing the dinitrile or a mixture of the dintrile and mononitrile into contact with the alkali-metal compound at a temperature of at least 100° C.

In a preferred embodiment of the invention, a polymer containing, as a repeating unit, at least one of the aminopyrimidine structures represented by formulas A, B, and C

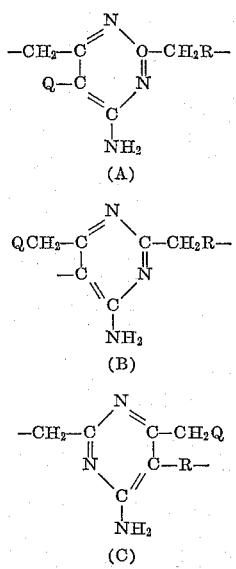

is formed by condensation of a dinitrile, $NCCH_2RCH_2CN$, and a mononitrile, $QCH_2CN$, as described above. It should be understood that the double bonds in the above formulas are actually not completely localized, and that each formula represents but one of several contributing resonance forms.

The following examples illustrate the products and process of this invention. They are not intended to limit it in any manner.

EXAMPLE 1

*Copolymerization of sebaconitrile and acetonitrile*

A mixture of 32.8 g. of sebaconitrile, 8.2 g. of acetonitrile, and 1.0 g. of sodium methoxide was heated for 12 hours at 150° C. in a closed reactor under autogenous pressure with agitation by rocking. The product was dissolved in methylene chloride, and the solution was washed with water and dried over anhydrous magnesium sulfate. After removal of the methylene chloride by distillation, there was obtained 32 g. of sebaconitrile/acetonitrile (1/1) copolymer as a viscous, amber liquid. A sample of the higher-molecular-weight portion of the product was isolated as an opaque solid by cooling a methylene chloride solution of the product to −80° C. At 25° C. this fraction was a clear, sticky solid, soluble in dilute hydrochloric acid.

*Analysis.*—Calcd. for $C_{12}H_{19}N_3$ (1/1 copolymer of sebaconitrile and acetonitrile): C, 70.20; H, 9.33; N, 20.48. Found: C, 70.18; H, 9.40; N, 20.17.

The presence of aminopyrimidine units was shown by the presence of a peak at 2670 A. in the ultraviolet absorption spectrum, compared with a peak at 2640 A. for the model compound 4-amino-2,6-dimethylpyrimidine, and by bands at $6.10\mu$, $6.25\mu$, and $6.35\mu$, corresponding to a system of conjugated double bonds, in the infrared absorption spectrum.

A mixture of one gram of the copolymer prepared as described above and 0.5 g. of α,α,α′,α′-tetramethyl-m-xylylene diisocyanate was heated for several minutes. A tough rubbery solid was obtained.

Sebaconitrile/acetonitrile copolymer (the viscous, amber liquid of Example 1) (0.5 g.) was dissolved in methylene chloride, and 0.3 g. of 2,5-tolylene diisocyanate was added. There was thus obtained a composition that could be used to coat substrates such as glass, metal, and wood. For example, when part of the mixture was applied as a coating to a glass plate and the coating and substrate were heated at 100° C. for two days, a solid coating that could be marked by a 3H pencil but not by a 2H pencil was obtained. When the coating experiment was repeated at 130° C., only about two hours were required to give the same result. When still another portion of the original mixture was allowed to stand for one day at room temperature, it became more viscous but did not gel.

EXAMPLE 2

*Copolymerization of sebaconitrile and acetonitrile*

A mixture of 2.05 g. of acetonitrile, 4.92 g. of sebaconitrile, and 0.05 g. of sodium hydride as a 50% dispersion in mineral oil was heated at 150° C. for 12 hours in a closed glass reactor at autogenous pressure. The product mixture was dissolved in methylene chloride, and the solution was dried over anhydrous magnesium sulfate. Addition of petroleum ether to the dry solution brought down a precipitate, which was separated by decantation and dried at 105° C. under vacuum to give 4.1 g. of sebaconitrile/acetonitrile copolymer as a clear, amber, tacky resin, soluble in dilute hydrochloric acid.

EXAMPLE 3

*Copolymerization of sebaconitrile and acetonitrile*

The procedure of Example 2 was repeated, except that 0.04 g. of butyllithium as a 19% solution in heptane was used as the catalyst. The yield of sebaconitrile/acetonitrile copolymer was 3.5 g. The copolymer had the same properties as the product of Example 2.

EXAMPLE 4

*Copolymerization of sebaconitrile and acetonitrile*

The procedure of Example 2 was repeated, except that 0.03 g. of cyanomethylpotassium, formed by cautious addition of 0.015 g. of potassium to the acetonitrile before addition of the sebaconitrile, was used as catalyst. There was obtained 2.3 g. of sebaconitrile-acetonitrile copolymer, similar in properties to the product of Example 2.

EXAMPLE 5

*Polymerization of sebaconitrile*

A mixture of 30 g. of sebaconitrile and 2 g. of potassium tert-butoxide was heated slowly with stirring to 200° C. in an atmosphere of nitrogen. The mixture was stirred at 200° C. until the mixture was a solid mass (three hours). On cooling, an essentially colorless, leathery, apparently plasticized, solid polymer of sebaconitrile was obtained. Extraction of a small sample of the product with ethyl alcohol removed the plasticizing agent and left a friable solid polymer. The alcohol-extracted polymer was pulverized, extracted with methylene chloride, and dried at 100° C. under reduced pressure.

*Analysis.*—Calcd. for $C_{10}H_{16}N_2$: N, 17.0. Found: N, 16.2.

The infrared absorption spectrum had bands at $3.0\mu$ and $3.15\mu$ (N—H); $4.44\mu$ (C≡N); and $6.12\mu$ and $6.37\mu$ (C═C and/or C═N), corresponding to a polymer containing aminopyrimidine units and lateral polymethylenecyano groups. It was intractable and insoluble, indicating that it was cross-linked.

EXAMPLE 6

*Copolymerization of suberonitrile and acetonitrile*

A mixture of 54.4 g. of suberonitrile, 16.4 g. of acetonitrile, and 1.1 g. of sodium methoxide was heated at 150° C. under 1,000 atmospheres' helium pressure for eight hours. The sticky suberonitrile/acetonitrile copolymer that resulted was dissolved in methylene chloride, and the solution was filtered to remove small amounts of inorganic matter. The polymer was partially fractionated by adding water to the filtrate. The sticky gum that precipitated was separated by decantation of the liquid and dissolved in dilute hydrochloric acid. The solution was filtered through diatomaceous earth, and the polymer was reprecipitated by neutralizing with dilute sodium hydroxide. After drying at 100° C. under reduced pressure, there was obtained 15 g. of glassy, solid copolymer.

The copolymer contained 22.78% nitrogen (calc'd for suberonitrile/acetonitrile (1/1), 23.7%) and had a molecular weight of about 700 (ebull. in $CH_2Cl_2$).

EXAMPLE 7

*Polymerization of suberonitrile*

A mixture of 4.0 g. of suberonitrile and 0.1 g. of sodium methoxide was placed in a collapsible platinum tube, which was heated at 150° C. under 3,000 atmospheres' pressure for eight hours. After cooling, the tube was cut open and found to contain an elastomeric polymer, which was extracted with methylene chloride. On treatment of the extract with water, a small amount of solid precipitated. The methylene chloride solution was separated, dried over magnesium sulfate, and evaporated to remove the solvent, to give 1.5 g. of a water-white, tacky, resinous polymer of suberonitrile.

*Analysis.*—Calcd. for $(C_8H_{12}N_2)_n$: C, 20.6. Found: C, 20.04.

It is essential that the R group in the dinitrile have a chain of at least four carbon atoms separating the two $CH_2CN$ groups; otherwise little or no polymerization occurs because cyclization takes place preferentially. For reasons of availability and reactivity, a preferred group of dinitriles are those defined above in which R contains 4–14 carbons. Examples of suitable dinitriles are sebaconitrile, azelaonitrile, suberonitrile, 3-methylazelanotrile, 3-ethylsuberonitrile, 3,3,6,6-tetramethylsuberonitrile, octadecanedinitrile, 3,13-dimethylhexadecanedinitrile, 1,3-cyclohexanedipropionitrile, 1,2-benzenedipropionitrile, 1,4-(2,5-dimethylbenzene)bis(4-methylbutyronitrile), 1,5-naphthalenediacetonitrile, and 9,10-anthracenediacetonitrile. For reasons of availability, an especially preferred group are the aliphatic dinitriles, especially the straight-chain dinitriles in which R contains 4–10 carbons.

Also for reasons of reactivity and availability, a preferred group of mononitriles are those defined above in which Q contains 0–10 carbons. Examples of suitable mononitriles are acetonitrile, propionitrile, cyclohexaneacetonitrile, phenylacetonitrile, 1-naphthaleneacetonitrile, isovaleronitrile, tert-butylacetonitrile, 5-cyclopentylvaleronitrile, and dodecanenitrile. For reasons of availability, an especially preferred class is that in which Q is hydrogen or lower alkyl.

The alkali-metal compound that catalyzes the polymerization can be represented by the formula MR′, where M is an alkali metal and R′ is hydrogen; saturated alkyl, α-cyanoalkyl, or cycloalkyl; or saturated alkoxy or cycloalkoxy. Because of availability, a preferred class is that described above in which the alkyl, α-cyanoalkyl, cycloalkyl, alkoxy, or cycloalkoxy group contains 1–12 carbons. Examples of suitable catalysts are lithium hydride, isoamyllithium, cyclohexylsodium, dodecylpotassium, α-cyanoethylrubidium, lithium ethoxide, sodium dodecoxide, potassium cyclohexoxide, rubidium 2-ethylhexoxide, and cesium 5-cyclopentylpentoxide. Alkali-metal alkoxides and cycloalkoxides are especially preferred, because they usually give polymers of higher molecular weight. For economic reasons, sodium and potassium salts of lower alkanols are especially preferred within the latter class.

Any temperature from 100° C. up to the decomposition point of the product can be used. The preferred range is 125–200° C.

The mole ratio of dinitrile to alkali-metal alkoxide is not critical. It can be as high as 100:1 or as low as 1:1. Usually it is in the range 5:1–25:1.

The preferred polymers from the standpoint of solubility and workability are obtained when a mononitrile is used together with the dinitrile. Preferably the dinitrile and mononitrile are used in approximately equimolar amounts. Under these conditions, and at the autogenous pressures of closed systems, polymers having molecular weights of several hundred are obtained. Higher molecular weights can be realized by raising slightly the molar ratio of dinitrile to mononitrile and by increasing the hydrostatic pressure of the system. Polymers of higher molecular weight can also be made by reacting the initially resulting polymers with compounds containing two or more functions reactive toward amino groups, e.g., diisocyanates. The process can also be run at atmospheric pressure or even lower, especially when the reaction temperature is below the boiling point of any of the nitriles being used.

The copolymers forming the preferred embodiment of this invention are useful as adhesives and in the production of synthetic elastomeric materials. In addition, because of the presence of amino groups, the polymers of this invention are substantive to a variety of dyes, especially acid dyes and are useful as additives to fiber and film forming polymers to increase dye sensitivity. As blends with other polymers they are useful in preparing antistatic coatings and ion exchange resins.

Many equivalent modifications will be apparent to those skilled in the art from a reading of the above without a departure from the inventive concept.

What is claimed is:

1. A process for forming a polymer containing aminopyrimidine nuclei as repeating units which comprises heating at a temperature of at least about 100° C. (a) a compound of the formula

NCCH₂RCH₂CN (b) a compound of the formula

QCH₂CN and (c) a derivative of an alkali metal from the class consisting of (1) an alkyl derivative, (2) an α-cyanoalkyl derivative, (3) a cycloalkyl derivative, (4) an alkoxide, (5) a cycloalkoxide and (6) a hydride, wherein —R— is a divalent, aliphatically saturated hydrocarbyl radical containing from about 4 to about 14 carbon atoms and separating the carbons to which it is joined in the said compound (a) by at least four carbon atoms, Q— is a member of the class consisting of hydrogen and a monovalent, aliphatically saturated hydrocarbyl radical containing from about 1 to about 10 carbon atoms, the mol ratio of (a) to (c) being from about 100 to 1 to 1 to 1 and the mol ratio of (a) to (b) being from 100 to 0 to about 1 to 1.

2. A polymer consisting essentially of at least about four repeating units of at least one of the aminopyrimidine structures of the formulae

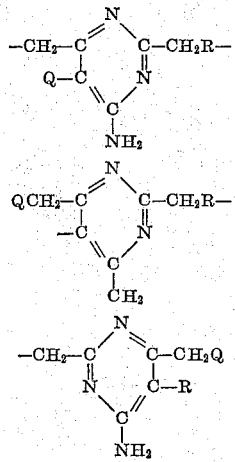

wherein —R— is a divalent, aliphatically saturated hydrocarbyl radical containing from about 4 to about 14 carbon atoms and separating the carbons to which it is joined by at least 4 carbon atoms; and —Q is a member of the class consisting of hydrogen and a monovalent, aliphatically saturated hydrocarbyl radical containing from about 1 to about 10 carbon atoms.

3. The polymer of claim 2 wherein the aminopyrimidine structure is of the formula

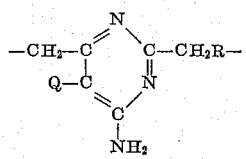

4. The polymer of claim 2 wherein the aminopyrimidine structure is of the formula

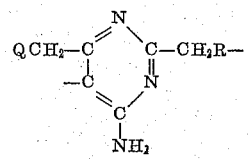

5. The polymer of claim 2 wherein the aminopyrimidine structure is of the formula

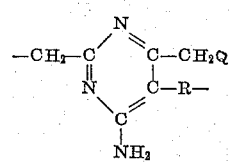

References Cited in the file of this patent
UNITED STATES PATENTS

| | | |
|---|---|---|
| 2,540,826 | Larchar | Feb. 6, 1951 |
| 2,695,292 | Mahan et al. | Nov. 23, 1954 |
| 3,049,544 | Stenbuck | Aug. 14, 1962 |